United States Patent
Ma et al.

(10) Patent No.: US 9,812,885 B2
(45) Date of Patent: Nov. 7, 2017

(54) BATTERY INTELLIGENT MANAGEMENT METHOD, BATTERY INTELLIGENT MANAGEMENT APPARATUS, AND BATTERY

(71) Applicant: Huawei Technologies Canada Co., Ltd., Shenzhen (CN)

(72) Inventors: Xiangmin Ma, Shenzhen (CN); Dingwang Zhu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 239 days.

(21) Appl. No.: 14/788,068

(22) Filed: Jun. 30, 2015

(65) Prior Publication Data

US 2016/0020619 A1    Jan. 21, 2016

Related U.S. Application Data

(63) Continuation of application No. PCT/CN2014/092474, filed on Nov. 28, 2014.

(30) Foreign Application Priority Data

Apr. 16, 2014    (CN) .......................... 2014 1 0153009

(51) Int. Cl.
*H02J 7/00* (2006.01)
*H01M 10/44* (2006.01)
*H01M 10/48* (2006.01)
*H01M 10/633* (2014.01)
*H01M 10/635* (2014.01)
*H01M 10/617* (2014.01)

(52) U.S. Cl.
CPC ........... *H02J 7/007* (2013.01); *H01M 10/441* (2013.01); *H01M 10/443* (2013.01);
(Continued)

(58) Field of Classification Search
CPC ............... H02J 7/0031; H02J 2007/004; H02J 2007/0037; Y02E 60/12; H01M 10/48
(Continued)

(56) References Cited

U.S. PATENT DOCUMENTS

2001/0000212 A1* 4/2001 Reipur ............... G01R 31/3613
                                                        320/104
2004/0113587 A1* 6/2004 Bohne .................. H02J 7/0004
                                                        320/128

(Continued)

FOREIGN PATENT DOCUMENTS

CN    101083336 A    12/2007
CN    102044886 A    5/2011
(Continued)

*Primary Examiner* — Arun Williams
(74) *Attorney, Agent, or Firm* — Slater Matsil, LLP

(57) ABSTRACT

The present invention discloses a battery intelligent management apparatus. A recognizing unit is configured to recognize a specification of a power supply assembly. A storage unit is configured to store management modes of power supply assemblies of various specifications, where the management modes of the power supply assemblies are in one-to-one correspondence with the specifications of the power supply assemblies. A control unit is configured to extract, from the storage unit and according to the specification, recognized by the recognizing unit, of the power supply assembly, a management mode corresponding to the specification of the power supply assembly, and perform charge management on the power supply assembly by using the management mode.

20 Claims, 6 Drawing Sheets

(52) U.S. Cl.
CPC ....... *H01M 10/482* (2013.01); *H01M 10/486* (2013.01); *H01M 10/488* (2013.01); *H01M 10/617* (2015.04); *H01M 10/633* (2015.04); *H01M 10/635* (2015.04); *H02J 7/0021* (2013.01); *H02J 7/0022* (2013.01); *H02J 7/0047* (2013.01)

(58) Field of Classification Search
USPC ........................................................ 320/134
See application file for complete search history.

(56) References Cited

U.S. PATENT DOCUMENTS

| | | | | |
|---|---|---|---|---|
| 2005/0017679 | A1* | 1/2005 | Tashiro | H02J 7/0004 320/112 |
| 2006/0022633 | A1* | 2/2006 | Nguyen | H02J 7/0003 320/106 |
| 2007/0123304 | A1* | 5/2007 | Pattenden | G06F 1/26 455/557 |
| 2008/0122400 | A1* | 5/2008 | Kubota | H02J 7/0004 320/106 |
| 2011/0181245 | A1 | 7/2011 | Wey et al. | |
| 2013/0300347 | A1 | 11/2013 | Xu | |

FOREIGN PATENT DOCUMENTS

| | | |
|---|---|---|
| CN | 102087339 A | 6/2011 |
| CN | 102709616 A | 10/2012 |
| CN | 102842739 A | 12/2012 |
| CN | 103048665 A | 4/2013 |
| CN | 103336245 A | 10/2013 |
| CN | 103367823 A | 10/2013 |
| CN | 103944225 A | 7/2014 |

\* cited by examiner

BATTERY INTELLIGENT MANAGEMENT METHOD, BATTERY INTELLIGENT MANAGEMENT APPARATUS, AND BATTERY

This application is a continuation in part of International Application No. PCT/CN2014/092474, filed on Nov. 28, 2014, which claims priority to Chinese Patent Application No. 201410153009.6, filed on Apr. 16, 2014, both of which are hereby incorporated by reference in their entireties.

TECHNICAL FIELD

The present invention relates to the field of batteries, and in particular to a battery intelligent management method, a battery intelligent management apparatus, and a battery.

BACKGROUND

Batteries are widely applied to fields such as backup power sources for communications switching and transmission systems, mobile communications systems, and power systems. In the prior art, battery information is mainly managed by recognizing production information by using visual barcode, and by recognizing information such as a battery specification by using a data plate silk screen. This battery information management manner is simply a recording function, and in a specific working process of a battery, no measure is taken to manage a working status of the battery. As a result, a best working status of the battery cannot be maintained and a battery life cannot be extended.

SUMMARY

Embodiments of the present invention provide an intelligent battery management apparatus, a battery that includes the intelligent battery management apparatus, and a battery intelligent management method, so that the battery can be managed automatically and distinctively, thereby maintaining a best working status of the battery and prolonging a service life of the battery.

According to a first aspect, the present invention provides a battery intelligent management method, including the following steps: recognizing, by a battery intelligent management apparatus, a specification of a power supply assembly of a battery, where the battery intelligent management apparatus stores management modes of power supply assemblies of various specifications, and where the management modes of the power supply assemblies are in one-to-one correspondence with the specifications of the power supply assemblies; and extracting, by the battery intelligent management apparatus, a management mode corresponding to the specification of the power supply assembly from the battery intelligent management apparatus according to the recognized specification of the power supply assembly, and performing charge management on the power supply assembly by using the extracted management mode.

With reference to the first aspect, in a first possible implementation manner, the battery intelligent management apparatus detects an accumulated time of power grid disconnection within a preset time and an accumulated time of a high temperature, during which a working temperature of the battery exceeds a preset temperature within a preset time; and when the accumulated time of power grid disconnection within the preset time is less than or equal to 10 hours, and the accumulated time of a high temperature, during which the working temperature of the battery exceeds the preset temperature, within the preset time is also less than or equal to 10 hours, determines that the specification of the power supply assembly is a B-type float charged battery, where for the B-type float charged battery, a corresponding management mode extracted by the battery intelligent management apparatus is: a charge current limiting point is less than or equal to 0.10 C and a charge voltage is 2.20-2.23V/CELL; and charge management is performed on the B-type float charged battery by using the management mode.

With reference to the first aspect, in a second possible implementation manner, the battery intelligent management apparatus detects an accumulated time of power grid disconnection within a preset time and an accumulated time of a high temperature, during which a working temperature of the battery exceeds a preset temperature within a preset time; and when the accumulated time of power grid disconnection within the preset time is in a range that is greater than or equal to 30 hours, and the accumulated time of a high temperature, during which the working temperature of the battery exceeds the preset temperature, within the preset time is in a range of 10-20 hours, determines that the specification of the power supply assembly is an A-type cycle battery, where for the A-type cycle battery, a corresponding management mode extracted by the battery intelligent management apparatus is: a charge current limiting point is in a range of 0.10-0.15 C and a charge voltage is 2.23-2.27V/CELL; and charge management is performed on the A-type cycle battery by using the management mode.

With reference to the first aspect, in a third possible implementation manner, the battery intelligent management apparatus detects an accumulated time of power grid disconnection within a preset time and an accumulated time of a high temperature, during which a working temperature of the battery exceeds a preset temperature within a preset time; and when the accumulated time of power grid disconnection within the preset time is in a range that is greater than or equal to 30 hours, and the accumulated time of a high temperature, during which the working temperature of the battery exceeds the preset temperature, within the preset time is in a range that is greater than or equal to 30 hours, determines that the specification, selected for the battery, of the power supply assembly is a C-type high temperature battery, where for the C-type high temperature battery, a corresponding management mode extracted by the battery intelligent management apparatus is: a charge current limiting point is in a range that is greater than or equal to 0.15 C and a charge voltage is 2.23-2.27V/CELL; and charge management is performed on the C-type high temperature battery by using the management mode.

With reference to the first aspect or any one of the first possible implementation manner to the third possible implementation manner of the first aspect, in a fourth possible implementation manner, the battery intelligent management apparatus detects discharge data in a discharge process of the power supply assembly, where the battery intelligent management apparatus further stores a preset-capacity parameter table, where the preset-capacity parameter table includes a capacity coefficient in charge and discharge processes of the power supply assembly and alarm protection points of a voltage and a current in the charge and discharge processes of the power supply assembly; the battery intelligent management apparatus calculates an actual battery capacity of the power supply assembly according to the discharge data and the preset-capacity parameter table, calculates a health status of the power supply assembly according to the actual battery capacity of the power supply assembly, and alerts an operator to the health status by means of alarm.

With reference to the fourth possible implementation manner of the first aspect, in a fifth possible implementation manner, the battery intelligent management apparatus detects a working ambient temperature of the power supply assembly, and enabling a cooling function when the detected working ambient temperature of the power supply assembly is higher than a preset temperature value; and enabling a heating function when the detected working ambient temperature of the power supply assembly is lower than the preset temperature value.

According to a second aspect, the present invention provides a battery intelligent management apparatus, interconnected with a battery, where the battery intelligent management apparatus includes a recognizing unit, a storage unit, and a control unit; where the recognizing unit is configured to recognize a specification of a power supply assembly of the battery; the storage unit is configured to store management modes of power supply assemblies of various specifications, where the management modes of the power supply assemblies are in one-to-one correspondence with the specifications of the power supply assemblies; and the control unit is configured to: extract a management mode corresponding to the specification of the power supply assembly from the storage unit according to the specification, recognized by the recognizing unit, of the power supply assembly, and perform charge management on the power supply assembly by using the management mode.

With reference to the second aspect, in a first possible implementation manner, the recognizing unit is configured to detect an accumulated time of power grid disconnection within a preset time and an accumulated time of a high temperature, during which a working temperature of the battery exceeds a preset temperature within a preset time; and when the accumulated time of power grid disconnection within the preset time is less than or equal to 10 hours, and the accumulated time of a high temperature, during which the working temperature of the battery exceeds the preset temperature, within the preset time is also less than or equal to 10 hours, determine that the specification of the power supply assembly is a B-type float charged battery; and for the B-type float charged battery, the control unit is specifically configured to extract a corresponding management mode from the storage unit, where the corresponding management mode is a charge current limiting point is less than or equal to 0.10 C and a charge voltage is 2.20-2.23V/CELL; and perform charge management on the B-type float charged battery by using the management mode.

With reference to the second aspect, in a second possible implementation manner, the recognizing unit is configured to detect an accumulated time of power grid disconnection within preset time and an accumulated time of a high temperature, during which a working temperature of the battery exceeds a preset temperature within a preset time; and when the accumulated time of power grid disconnection within the preset time is in a range that is greater than or equal to 30 hours, and the accumulated time of a high temperature, during which the working temperature of the battery exceeds the preset temperature, within the preset time is in a range of 10-20 hours, determine that the specification of the power supply assembly is an A-type cycle battery; and for the A-type cycle battery, the control unit is specifically configured to extract a corresponding management mode from the storage unit, where the corresponding management mode is: a charge current limiting point is in a range of 0.10-0.15 C and a charge voltage is 2.23-2.27V/CELL; and perform charge management on the A-type cycle battery by using the management mode.

With reference to the second aspect, in a third possible implementation manner, the recognizing unit is configured to detect an accumulated time of power grid disconnection within a preset time and an accumulated time of a high temperature, during which a working temperature of the battery exceeds a preset temperature, within the preset time; and when the accumulated time of power grid disconnection within a preset time is in a range that is greater than or equal to 30 hours, and the accumulated time of a high temperature, during which the working temperature of the battery exceeds the preset temperature, within the preset time is in a range that is greater than or equal to 30 hours, determine that the specification, selected for the battery, of the power supply assembly is a C-type high temperature battery; and for the C-type high temperature battery, the control unit is specifically configured to extract a corresponding management mode from the storage unit, where the corresponding management mode is: a charge current limiting point is in a range that is greater than or equal to 0.15 C and a charge voltage is 2.23-2.27V/CELL; and perform charge management on the C-type high temperature battery by using the management mode.

With reference to the second aspect, or any one of the first possible implementation manner to the third possible implementation manner of the second aspect, in a fourth possible implementation manner, the battery intelligent management apparatus further includes a detecting unit and a calculating unit, and the storage unit is further configured to store a preset-capacity parameter table, where the preset-capacity parameter table includes a capacity coefficient in charge and discharge processes of the power supply assembly and alarm protection points of a voltage and a current in the charge and discharge processes of the power supply assembly; the detecting unit is configured to detect discharge data in a discharge process of the power supply assembly; the calculating unit is configured to: calculate an actual battery capacity of the power supply assembly according to the discharge data and the preset-capacity parameter table that is stored by the storage unit, and calculate a health status of the power supply assembly according to the actual battery capacity of the power supply assembly; and the control unit is further configured to alert, by means of alarm, an operator to the health status calculated by the calculating unit, so as to remind the operator of the power supply assembly to replace the battery.

With reference to the fourth possible implementation manner of the second aspect, in a fifth possible implementation manner, the discharge data includes one or more types of the following data: a voltage, a current, and a temperature.

With reference to the fourth possible implementation manner or the fifth possible implementation manner of the second aspect, in a sixth possible implementation manner, the battery intelligent management apparatus further includes a temperature control unit, where the detecting unit is further configured to detect a working ambient temperature of the power supply assembly; and the temperature control unit is configured to enable a cooling function when the detected working ambient temperature of the power supply assembly is higher than a preset temperature value; and enable a heating function when the detected working ambient temperature of the power supply assembly is lower than the preset temperature value.

According to a third aspect, the present invention further provides a battery, the battery includes a power supply assembly and the foregoing battery intelligent management apparatus, where the battery intelligent management apparatus is configured to manage the power supply assembly.

With reference to the third aspect, in a first possible implementation manner, a total voltage of the power supply assembly includes: 48V, 192V, or 384V.

It may be seen from the above that, according to the battery intelligent management apparatus, the battery, and the battery intelligent management method that are provided in the embodiments of the present invention, a specification of a power supply assembly of a battery is recognized by using the recognizing unit, a control unit extracts a management mode corresponding to the specification of the power supply assembly from a storage unit, and for power supply assemblies of different specifications, charge and discharge of the power supply assemblies are managed distinctively, thereby maintaining a best working status of the battery, prolonging a service life of the battery, and achieving battery intelligent management.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention.

Figure 1:
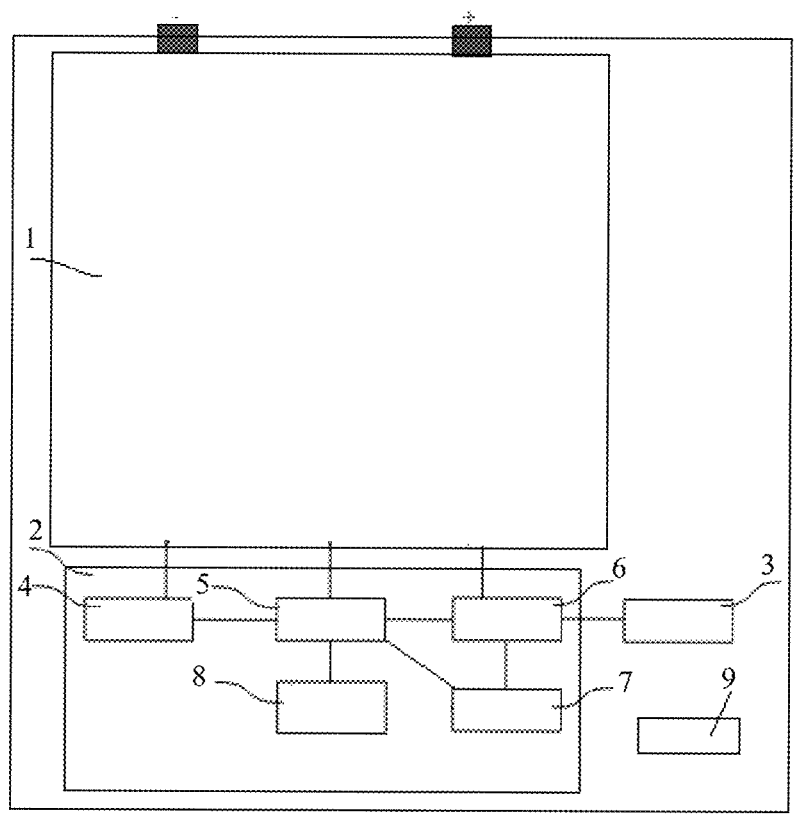
FIG. 1 is a schematic plane diagram of a battery according to an implementation manner of the present invention.
Figure 2:
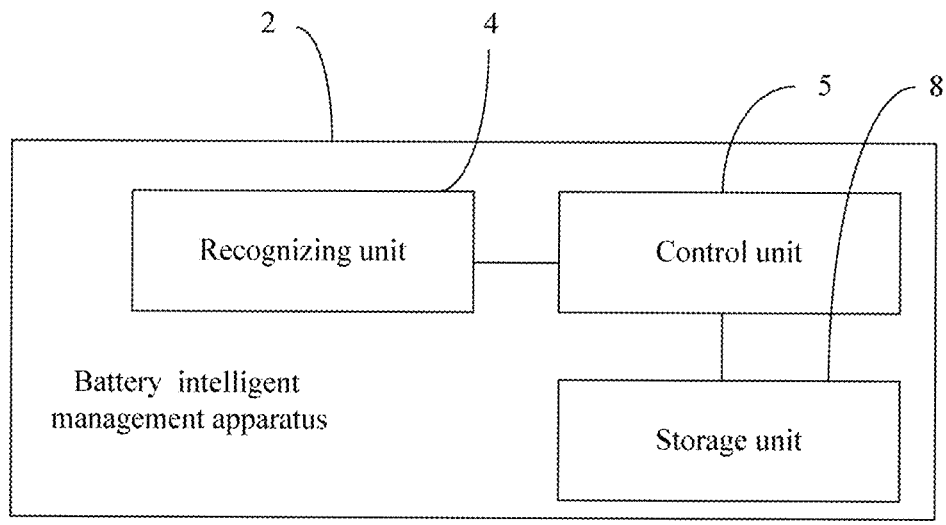
FIG. 2 is a schematic diagram of a battery intelligent management apparatus according to an implementation manner of the present invention.
Figure 3:
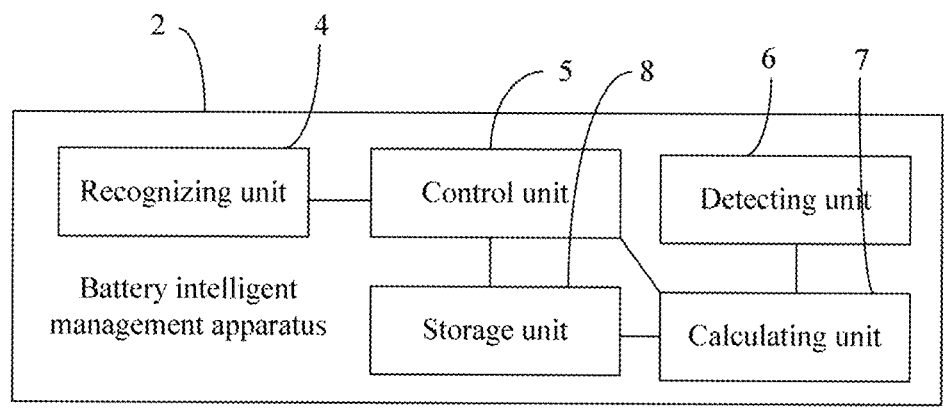
FIG. 3 is a schematic diagram of a battery intelligent management apparatus according to an implementation manner of the present invention.
Figure 4:
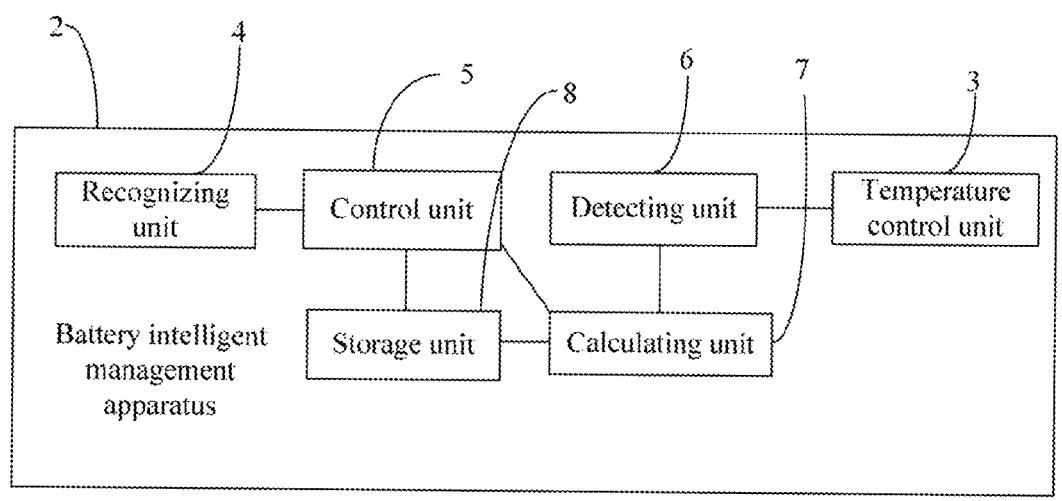
FIG. 4 is a schematic diagram of a battery intelligent management apparatus according to an implementation manner of the present invention.

The present invention provides a battery intelligent management apparatus and a battery that includes the battery intelligent management apparatus. As shown in FIG. 1, an embodiment of the present invention provides a battery, including a power supply assembly 1 and a battery intelligent management apparatus 2. Referring to FIG. 2 to FIG. 4, the battery intelligent management apparatus 2 includes a recognizing unit 4, a storage unit 8, and a control unit 5, where the recognizing unit 4 is configured to recognize a specification of the power supply assembly 1, the storage unit 8 is configured to store management modes of power supply assemblies 1 of various specifications, and the control unit 5 is configured to extract a management mode corresponding to the specification of the power supply assembly 1 from the storage unit 8 according to the specification recognized by the recognizing unit 4, and perform charge management on the power supply assembly 1 by using the management mode.

In the battery provided in the present invention, a specification of a power supply assembly 1 of the battery is recognized by using the recognizing unit 4, and a control unit 5 extracts a management mode corresponding to the specification of the power supply assembly 1 from a storage unit 8, and for power supply assemblies 1 of different specifications, charge and discharge of the power supply assemblies 1 are managed distinctively, that is, the control unit 5 extracts a management mode matching the power supply assembly 1 from the storage unit 8 according to the specification of the power supply assembly 1, to manage charge of the power supply assembly 1, thereby maintaining a best status of the battery, prolonging a service life of the battery, and achieving battery intelligent management. The power supply assembly 1 may be of different specifications such as an A-type cycle battery, a B-type float charged battery, or a C-type high temperature battery.

Charge and discharge are performed on batteries of different specifications by using corresponding management modes, so that power supply assemblies 1 of the batteries maintain a best status. For example, for an A-type cycle battery, an A-type cycle management mode is used to perform charge and discharge management on a power supply assembly 1; for a B-type float charged battery, a B-type float charge management mode is used to perform charge and discharge management on a power supply assembly 1; and for a C-type high temperature battery, a C-type high temperature management mode is used to perform charge and discharge management on a power supply assembly 1.

Specifically, when a specification is selected for a power supply assembly of a battery, a battery of a different specification is selected by investigating a power-grid-disconnected state and a high-temperature state of a device, and (as shown in the following table) a battery type and a different management mode are selected according to an accumulated time of power grid disconnection in a recent determined time (default value: X days) and an accumulated time of a high temperature, during which a preset temperature (default value: N degrees) is exceeded, in the recent determined time, where the accumulated time of power grid disconnection and the accumulated time of a high temperature are collected by a system module in the device.

| Accumulated time of power grid disconnection within X days | Accumulated time of a high temperature above N degrees within X days | Battery used | Charge current limiting point (C represents battery capacity) | Charge voltage |
|---|---|---|---|---|
| ≤10 hours | ≤10 hours | B-type float charged battery | ≤0.10 C | 2.20-2.23 V/CELL |
| 10-30 hours | 10-20 hours | A-type cycle battery | 0.10-0.15 C | 2.23-2.27 V/CELL |

-continued

| Accumulated time of power grid dis-connection within X days | Accumulated time of a high temperature above N degrees within X days | Battery used | Charge current limiting point (C represents battery capacity) | Charge voltage |
|---|---|---|---|---|
| ≥30 hours | 20-30 hours | A-type cycle battery | ≥0.15 C | 2.23-2.27 V/CELL |
| ≥30 hours | ≥30 hours | C-type high temperature battery | ≥0.15 C | 2.23-2.27 V/CELL |

The recognizing unit 4 is configured to detect an accumulated time of power grid disconnection within a preset time and an accumulated time of a high temperature, during which a working temperature of the battery exceeds a preset temperature within a preset time. Specifically, the recognizing unit 4 includes a grid-disconnected time detecting unit and a high-temperature detecting unit, where the grid-disconnected time detecting unit is configured to detect the accumulated time of power grid disconnection within the preset time, and the high-temperature detecting unit is configured to detect the accumulated time of high temperature, during which the preset temperature is exceeded, within the preset time. Examples of specific management modes are discussed below.

When the accumulated time of power grid disconnection within the preset time is less than or equal to 10 hours, and the accumulated time of a high temperature, during which the preset temperature is exceeded, within the preset time is also less than or equal to 10 hours, the recognizing unit 4 determines that the specification, selected for the battery, of the power supply assembly is a B-type float charged battery. A management mode for the B-type float charged battery is: a charge current limiting point is less than or equal to 0.10 C (that is, 0.10 times a capacity of the battery) and a charge voltage is 2.20-2.23V/CELL.

When the accumulated time of power grid disconnection within the preset time is in a range that is greater than or equal to 30 hours, and the accumulated time of a high temperature, during which the preset temperature is exceeded, within the preset time is in a range of 10-20 hours, the recognizing unit 4 determines that the specification, selected for the battery, of the power supply assembly is an A-type cycle battery, and a management mode for the A-type cycle battery is: a charge current limiting point is in a range of 0.10-0.15 C (that is, 0.10-0.15 times a capacity of the battery) and a charge voltage is 2.23-2.27V/CELL.

When the accumulated time of power grid disconnection within the preset time is in a range of 10-30 hours, and the accumulated time of a high temperature, during which the preset temperature is exceeded, within the preset time is in a range of 20-30 hours, the recognizing unit 4 determines that the specification, selected for the battery, of the power supply assembly is an A-type cycle battery, and in this case, a management mode for the A-type cycle battery is: a charge current limiting point is in a range that is greater than or equal to 0.15 C and a charge voltage is 2.23-2.27V/CELL.

When the accumulated time of power grid disconnection within the preset time is in a range that is greater than or equal to 30 hours, and the accumulated time of a high temperature, during which the preset temperature is exceeded, within the preset time is in a range that is greater than or equal to 30 hours, the recognizing unit 4 determines that the specification, selected for the battery, of the power supply assembly is a C-type high temperature battery, and a management mode for the C-type high temperature battery is: a charge current limiting point is in a range that is greater than or equal to 0.15 C and a charge voltage is 2.23-2.27V/CELL.

The battery intelligent management apparatus 2 further includes a detecting unit 6 and a calculating unit 7. The storage unit 8 is further configured to store a preset-capacity parameter table (not shown in the figure), where the preset-capacity parameter table includes a capacity coefficient in charge and discharge processes of the power supply assembly 1 and alarm protection points of a voltage and a current in the charge and discharge processes of the power supply assembly 1; the detecting unit 6 is configured to detect discharge data in a discharge process of the power supply assembly 1; and the calculating unit 7 is configured to calculate an actual battery capacity of the power supply assembly 1 according to the discharge data and the preset-capacity parameter table, and calculate a health status of the power supply assembly 1, and the calculating unit 7 reports the health status to the control unit 5.

Specifically, battery capacity coefficients of various batteries in different discharge current are recorded in the preset-capacity parameter table, an actual battery capacity is used to measure an amount of electricity actually stored when a battery is fully charged, and the actual battery capacity may be calculated by using the following formula: actual battery discharge capacity=battery discharge current×battery discharge time=actual battery capacity×battery capacity coefficient, and therefore, actual battery capacity=actual battery discharge capacity/battery capacity coefficient (which is a coefficient corresponding to the discharge current and the discharge capacity); and the battery capacity coefficient refers to a ratio of a battery discharge capacity to a rated battery capacity, where a maximum battery capacity coefficient is 1. In addition, a battery health level index is used to measure a health level of a battery (when the battery health level index is 1, it is indicated that a battery is 100% healthy, and in this case, the battery is in a desirable working state and there is no loss during discharge and charge of the battery), and the battery health level index may be calculated by the following formula: battery health level index=actual battery capacity/rated battery capacity. If the calculated battery health level index is relatively small, it is indicated that a health status of a power supply assembly is relatively poor, and the control unit alerts the health status to an operator by means of alarm, so as to remind that the battery needs to be replaced. For another example, battery status data may further include a state of charge (abbreviation: SOC) of a rest capacity of a battery, and the state of charge of the rest capacity of the battery is used to measure a percentage of an amount of the rest capacity of the battery in the actual battery capacity, where SOC of battery=(actual battery capacity-actual battery discharge capacity)/actual battery capacity.

The battery further includes a GPS positioning unit 9, where the GPS positioning unit 9 is configured to monitor a position of the battery, and when the position of the battery changes, the GPS positioning unit 9 acquires position information of the battery and gives an alarm. The GPA positioning unit can track the position of the battery in real time, preventing the battery from being stolen.

The detecting unit 6 is further configured to detect working ambient temperature of the power supply assembly, and the battery further includes a temperature control unit 3, where the temperature control unit 3 performs heating or cooling according to the temperature detected by the detecting unit 6. The temperature control unit 3 is configured to enable a cooling function when the detected working ambient temperature of the power supply assembly is higher than a preset temperature value, and enable a heating function when the detected working ambient temperature of the power supply assembly is lower than the preset temperature value. Setting of the temperature control unit 3 expands a temperature range of the battery. For example, when a temperature sensor of the temperature control unit 3 detects that the working ambient temperature of the battery is above 35 degrees, a built-in air conditioner of the temperature control unit 3 starts to work, to reduce an actual working temperature of the battery to within 30 degrees, and when the actual working temperature of the battery is below 25 degrees, the built-in air conditioner stops working; when the temperature sensor of the temperature control unit 3 detects that the working temperature of the battery is below 5 degrees, a built-in heating film of the temperature control unit 3 starts to work, to increase the actual working temperature of the battery to above 10 degrees, and when the actual working temperature of the battery is above 15 degrees, the built-in heating film stops working.

In an embodiment of the present invention, the temperature control unit 3 and the GPS positioning unit 9 coexist in the battery; and in another embodiment of the present invention, either of the control unit 3 or the GPS positioning unit 9 is set in the battery.

A total voltage of the power supply assembly 1 includes 48V, 192V, or 384V. The power supply assembly 1 is a high-voltage power supply assembly 1, so that an installation period can be shorten when a regular 2V, 6V, or 12V battery is used, and if a regular 2V, 6V, or 12V battery is used, multiple regular batteries need to be connected in series, and therefore, not only the installation period is long, but also a volume is increased. The battery provided in the present invention may be matched with a high-voltage system and be directly applied to a communications apparatus, which is convenient and time-saving.

A specification of the power supply assembly 1 includes any of the following data: a manufacturer, a battery type, an initial capacity, and a production date, and a management mode of the power supply assembly 1 includes a cycle battery management mode, a float charged battery management mode, and a high temperature battery management mode. The discharge data includes one or more types of the following data: a voltage, a current, or a temperature.

Figure 5:
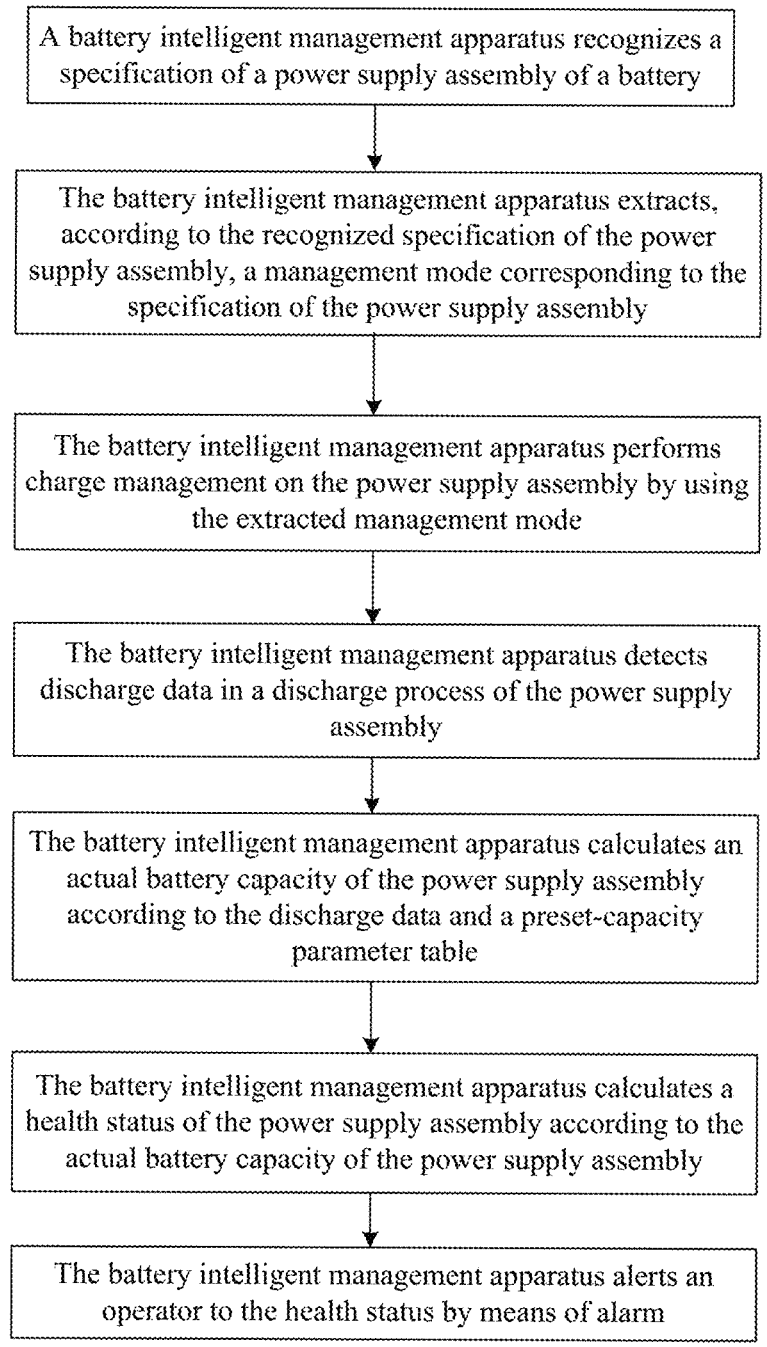
FIG. 5 is a schematic diagram of a battery intelligent management method according to an implementation manner of the present invention.

Referring to FIG. 5, the present invention further provides a battery intelligent management method, used for managing operation of a battery in an electronic product, and the battery intelligent management method includes the following steps.

A battery intelligent management apparatus recognizes a specification of a power supply assembly of a battery.

The battery intelligent management apparatus stores management modes of power supply assemblies of various specifications, where the management modes of the power supply assemblies are in one-to-one correspondence with the specifications of the power supply assemblies.

The battery intelligent management apparatus extracts a management mode corresponding to the specification of the power supply assembly from the battery intelligent management apparatus according to the recognized specification of the power supply assembly, and performs charge management on the power supply assembly by using the extracted management mode.

Specifications of power supply assemblies of different specifications are different, and the power supply assemblies of different specifications use management modes that match the specifications of the power supply assemblies, so that best working status of the power supply assemblies can be maintained and service lives of the power supply assemblies are prolonged. The management modes of the power supply assemblies of different specifications may be recorded and saved in the electronic product, and after a specification of a power supply assembly is recognized, a stored management mode is directly invoked. Certainly, the management mode may be input after the specification of the power supply assembly is recognized, and adjusted according to an environment in which the power supply assembly is used.

Figure 6:
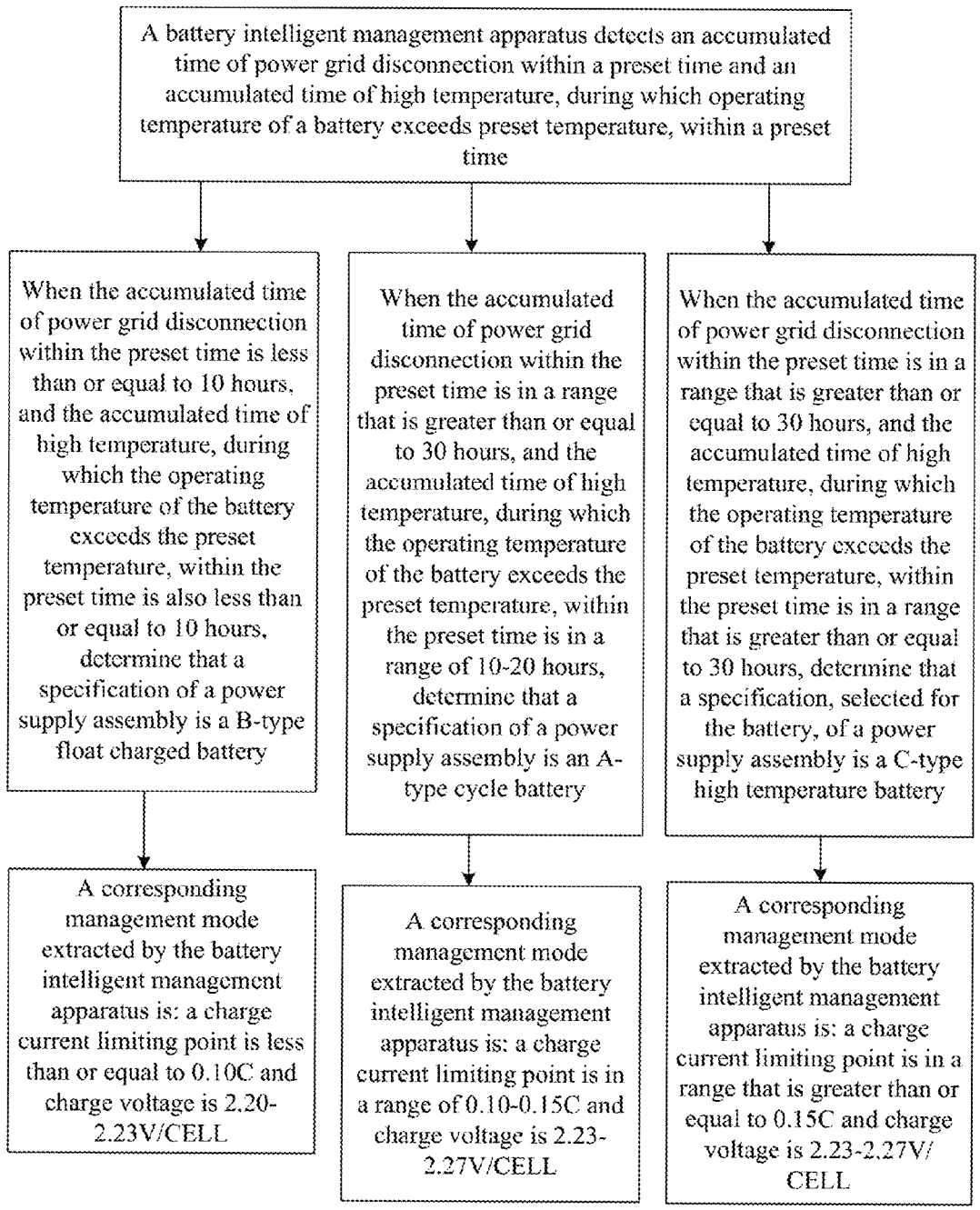
FIG. 6 is a schematic diagram of management mode selection in a battery intelligent management method according to an embodiment of the present invention.

Referring to FIG. 6, in an implementation manner of the present invention, the battery intelligent management method further includes detecting, by the battery intelligent management apparatus, an accumulated time of power grid disconnection within a preset time and an accumulated time of a high temperature, during which a working temperature of the battery exceeds a preset temperature within a preset time; and when the accumulated time of power grid disconnection within the preset time is less than or equal to 10 hours, and the accumulated time of a high temperature, during which the working temperature of the battery exceeds the preset temperature, within the preset time is also less than or equal to 10 hours, determining that the specification of the power supply assembly is a B-type float charged battery, where for the B-type float charged battery, a corresponding management mode extracted by the battery intelligent management apparatus is a charge current limiting point is less than or equal to 0.10 C and a charge voltage is 2.20-2.23V/CELL, and charge management is performed on the B-type float charged battery by using the management mode.

Referring to FIG. 6, in another implementation manner of the present invention, the battery intelligent management method further includes detecting, by the battery intelligent management apparatus, an accumulated time of power grid disconnection within a preset time and an accumulated time of a high temperature, during which a working temperature of the battery exceeds a preset temperature within a preset time; and when the accumulated time of power grid disconnection within the preset time is in a range that is greater than or equal to 30 hours, and the accumulated time of a high temperature, during which the working temperature of the battery exceeds the preset temperature, within the preset time is in a range of 10-20 hours, determining that the specification of the power supply assembly is an A-type cycle battery, where for the A-type cycle battery, a corresponding management mode extracted by the battery intelligent management apparatus is: a charge current limiting point is in a range of 0.10-0.15 C and a charge voltage is 2.23-2.27V/CELL, and charge management is performed on the A-type cycle battery by using the management mode.

Referring to FIG. 6, for another example, in an implementation manner of the present invention, the battery intelligent management method further includes detecting, by the battery intelligent management apparatus, an accumulated time of power grid disconnection within a preset time and an accumulated time of a high temperature, during which a working temperature of the battery exceeds a preset temperature within a preset time; and when the accumulated time of power grid disconnection within the preset time is in a range that is greater than or equal to 30 hours, and the accumulated time of a high temperature, during which the working temperature of the battery exceeds the preset temperature, within the preset time is in a range that is greater than or equal to 30 hours, determining that the specification, selected for the battery, of the power supply assembly is a C-type high temperature battery, where for the C-type high temperature battery, a corresponding management mode extracted by the battery intelligent management apparatus is a charge current limiting point is in a range that is greater than or equal to 0.15 C and a charge voltage is 2.23-2.27V/CELL; and charge management is performed on the C-type high temperature battery by using the management mode.

Referring to FIG. 5, further, the intelligent battery management method provided in the present invention further includes detecting, by the battery intelligent management apparatus, discharge data in a discharge process of the power supply assembly, where the battery intelligent management apparatus further stores a preset-capacity parameter table, where the preset-capacity parameter table includes a capacity coefficient in charge and discharge processes of the power supply assembly and alarm protection points of a voltage and a current in the charge and discharge processes of the power supply assembly; calculating, by the battery intelligent management apparatus, an actual battery capacity of the power supply assembly according to the discharge data and the preset-capacity parameter table; calculating a health status of the power supply assembly according to the actual battery capacity of the power supply assembly; and alerting an operator to the health status by means of alarm.

Specifically, a method for calculating the health status of the power supply assembly includes the following steps.

Battery capacity coefficients of various batteries in different discharge current are recorded in the preset-capacity parameter table, an actual battery capacity is used to measure an amount of electricity actually stored when a battery is fully charged, and the actual battery capacity may be calculated by using the following formula: actual battery discharge capacity=battery discharge current×battery discharge time=actual battery capacity×battery capacity coefficient, and therefore, actual battery capacity=actual battery discharge capacity/battery capacity coefficient (which is a coefficient corresponding to the discharge current and the discharge capacity); and the battery capacity coefficient refers to a ratio of a battery discharge capacity to a rated battery capacity, where a maximum battery capacity coefficient is 1. In addition, a battery health level index (that is, the health status) is used to measure a health level of a battery (when the battery health level index is 1, it is indicated that a battery is 100% healthy, and in this case, the battery is in a desirable working state and there is no loss during discharge and charge of the battery), and the battery health level index may be calculated by the following formula: battery health level index=actual battery capacity/rated battery capacity. If the calculated battery health level index is relatively small, an alarm, for example, that the battery lags, is reported, to alert an operator that the battery needs to be replaced. For another example, battery status data may further include a state of charge (abbreviation: SOC) of a rest capacity of a battery, and the state of charge of the rest capacity of the battery is used to measure a percentage of an amount of the rest capacity of the battery in the actual battery capacity, where SOC of battery=(actual battery capacity-actual battery discharge capacity)/actual battery capacity.

Further, the intelligent battery management method provided in the present invention further includes: detecting, by the battery intelligent management apparatus, a working ambient temperature of the power supply assembly; and enabling a cooling function when the detected working ambient temperature of the power supply assembly is higher than a preset temperature value, and enabling a heating function when the detected working ambient temperature of the power supply assembly is lower than the preset temperature value.

A battery is managed by using the battery intelligent management method, corresponding management modes are used according to power supply assemblies of different specifications, and by calculating a health status of a power supply assembly, a best status of the battery can be maintained and a service life of the battery can be prolonged.

Figure 7:
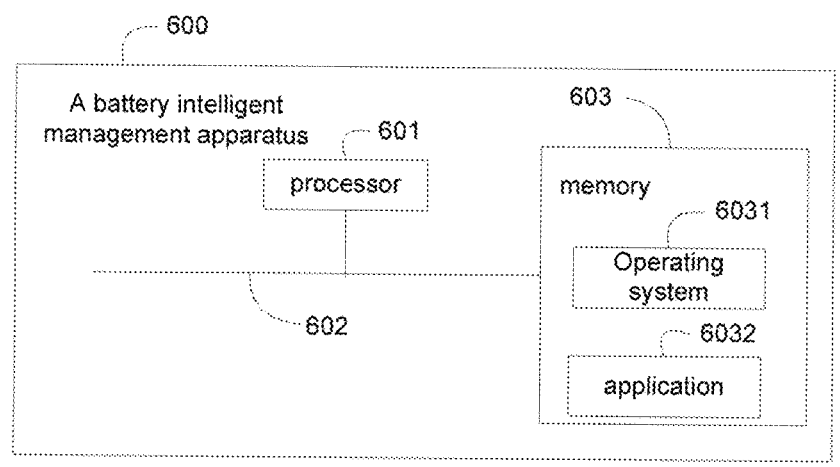
FIG. 7 is a schematic diagram of a battery intelligent management apparatus according to an implementation manner of the present invention.

Referring to FIG. 7, a battery intelligent management apparatus 600 is depicted. The battery intelligent management apparatus 600 includes a processor 601, a memory 603 and at least one communication bus 602. The communication bus 602 is configured to connect one or more of the components. The memory 603 may include read-only memory (ROM) and/or random access memory (RAM), and may provide instructions and data to the processor 601. The memory 603 may further include nonvalotile random access memory (NVRAM).

In some embodiments of the present invention, the processor 601 is configured to recognize a specification of a power supply assembly 1, the memory 603 is configured to store management modes of power supply assemblies 1 of various specifications, the processor 601 is further configured to extract a management mode corresponding to the specification of the power supply assembly 1 from the memory 603 according to the specification of the power supply assembly 1, and to perform charge management on the power supply assembly 1 using the management mode.

In the battery provided according to some embodiments, a specification of a power supply assembly 1 of the battery is recognized using the processor 601. A management mode corresponding to the specification of the power supply assembly 1 is extracted from the memory 603. For power supply assemblies 1 of different specifications, charge and discharge of the power supply assemblies 1 are managed distinctively, that is, the processor 601 extracts a management mode matching the power supply assembly 1 from the memory 603 according to the specification of the power supply assembly 1, to manage charge of the power supply assembly 1, thereby maintaining a best status of the battery, prolonging a service life of the battery, and achieving battery intelligent management. The power supply assembly 1 may be of different specifications such as an A-type cycle battery, a B-type float charged battery, or a C-type high temperature battery.

Charge and discharge management is performed on batteries of different specifications using corresponding management modes, so that power supply assemblies 1 of the batteries maintain an optimal status. For example, for an A-type cycle battery, an A-type cycle management mode is used to perform charge and discharge management on a power supply assembly 1; for a B-type float charged battery, a B-type float charge management mode is used to perform charge and discharge management on a power supply assembly 1; and for a C-type high temperature battery, a C-type high temperature management mode is used to perform charge and discharge management on a power supply assembly 1.

Specifically, when a specification is selected for a power supply assembly of a battery, a battery of a different specification is selected by investigating a power-grid-disconnected state and a high-temperature state of a device, and (as shown in the following table) a battery type and a different management mode are selected according to an accumulated time of power grid disconnection in a recent determined time (default value: X days) and an accumulated time of a high temperature, during which a preset temperature (default value: N degrees) is exceeded, in the recent determined time, where the accumulated time of power grid disconnection and the accumulated time of a high temperature are collected by a system module in the device.

When the accumulated time of power grid disconnection within the preset time is in a range of 10-30 hours, and the accumulated time of a high temperature, during which the preset temperature is exceeded, within the preset time is in a range of 20-30 hours, the processor 601 determines that the specification, selected for the battery, of the power supply assembly is an A-type cycle battery, and in this case, a management mode for the A-type cycle battery is: a charge current limiting point is in a range that is greater than or equal to 0.15 C and a charge voltage is 2.23-2.27V/CELL.

When the accumulated time of power grid disconnection within the preset time is in a range that is greater than or equal to 30 hours, and the accumulated time of a high temperature, during which the preset temperature is exceeded, within the preset time is in a range that is greater than or equal to 30 hours, the processor 601 determines that the specification, selected for the battery, of the power supply assembly is a C-type high temperature battery, and a management mode for the C-type high temperature battery is: a charge current limiting point is in a range that is greater than or equal to 0.15 C and a charge voltage is 2.23-2.27V/CELL.

| Accumulated time of power grid disconnection within X days | Accumulated time of a high temperature above N degrees within X days | Battery used | Charge current limiting point (C represents battery capacity) | Charge voltage |
|---|---|---|---|---|
| ≤10 hours | ≤10 hours | B-type float charged battery | ≤0.10 C | 2.20-2.23 V/CELL |
| 10-30 hours | 10-20 hours | A-type cycle battery | 0.10-0.15 C | 2.23-2.27 V/CELL |
| ≥30 hours | 20-30 hours | A-type cycle battery | ≥0.15 C | 2.23-2.27 V/CELL |
| ≥30 hours | ≥30 hours | C-type high temperature battery | ≥0.15 C | 2.23-2.27 V/CELL |

The processor 601 is configured to detect an accumulated time of power grid disconnection within a preset time and an accumulated time of a high temperature, during which a working temperature of the battery exceeds a preset temperature within a preset time. Examples of specific management modes are discussed below.

When the accumulated time of power grid disconnection within the preset time is less than or equal to 10 hours, and the accumulated time of a high temperature, during which the preset temperature is exceeded, within the preset time is also less than or equal to 10 hours, the processor 601 determines that the specification, selected for the battery, of the power supply assembly is a B-type float charged battery. A management mode for the B-type float charged battery is: a charge current limiting point is less than or equal to 0.10 C (that is, 0.10 times a capacity of the battery) and a charge voltage is 2.20-2.23V/CELL.

When the accumulated time of power grid disconnection within the preset time is in a range that is greater than or equal to 30 hours, and the accumulated time of a high temperature, during which the preset temperature is exceeded, within the preset time is in a range of 10-20 hours, the processor 601 determines that the specification, selected for the battery, of the power supply assembly is an A-type cycle battery, and a management mode for the A-type cycle battery is: a charge current limiting point is in a range of 0.10-0.15 C (that is, 0.10-0.15 times a capacity of the battery) and a charge voltage is 2.23-2.27V/CELL.

Furthermore, the memory 603 is further configured to store a preset-capacity parameter table (not shown in FIG. 7), where the preset-capacity parameter table includes a capacity coefficient in charge and discharge processes of the power supply assembly 1 and alarm protection points of a voltage and a current in the charge and discharge processes of the power supply assembly 1. The processor 601 is configured to detect discharge data in a discharge process of the power supply assembly 1 and calculate an actual battery capacity of the power supply assembly 1 according to the discharge data and the preset-capacity parameter table. The processor 601 is further configured to calculate a health status of the power supply assembly 1 according to the actual battery capacity of the power supply assembly 1, and alert, by means of alarm, an operator to the health status so as to remind the operator of the power supply assembly to replace the battery.

Specifically, battery capacity coefficients of various batteries in different discharge current are recorded in the preset-capacity parameter table, and an actual battery capacity is used to measure an amount of electricity actually stored when a battery is fully charged. The actual battery capacity may be calculated by using the following formula: actual battery discharge capacity=battery discharge current× battery discharge time=actual battery capacity×battery capacity coefficient, and therefore, actual battery capacity=actual battery discharge capacity/battery capacity coefficient (which is a coefficient corresponding to the discharge current and the discharge capacity); and the battery capacity coefficient refers to a ratio of a battery discharge capacity to a rated battery capacity, where a maximum battery capacity coefficient is 1. In addition, a battery health level index is used to measure a health level of a battery (when the battery health level index is 1, it is indicated that a battery is 100% healthy, and in this case, the battery is in a desirable working state and there is no loss during discharge and charge of the battery), and the battery health level index may be calculated by the following formula: battery health level index=actual battery capacity/rated battery capacity. If the calculated battery health level index is relatively small, it is indicated that a health status of a power supply assembly is relatively poor, and the control unit alerts the health status to an operator by means of alarm, so as to remind that the battery needs to be replaced. For another example, battery status data may further include a state of charge (abbreviation: SOC) of a rest capacity of a battery, and the state of charge of the rest capacity of the battery is used to measure a percentage of an amount of the rest capacity of the battery in the actual battery capacity, where SOC of battery=(actual battery capacity-actual battery discharge capacity)/actual battery capacity.

The foregoing descriptions are merely exemplary implementation manners of the present invention. It should be noted that a person of ordinary skill in the art may make some improvements or polishing without departing from the principle of the present invention and such improvements or polishing shall also fall within the protection scope of the present invention.

What is claimed is:

1. A method for battery intelligent management the method comprising:
    detecting, by a battery intelligent management apparatus, an accumulated time of power grid disconnection within a preset time, and an accumulated time of a high temperature during which a working temperature of a battery exceeds a preset temperature within a preset time;
    recognizing, by the battery intelligent management apparatus, a specification of a power supply assembly of the battery according to the detected accumulated time of power grid disconnection or the accumulated time of the high temperature, wherein the battery intelligent management apparatus stores a plurality of management modes of power supply assemblies of various specifications, wherein the management modes of the power supply assemblies are in one-to-one correspondence with the specifications of the power supply assemblies; and
    extracting, by the battery intelligent management apparatus, a management mode corresponding to the recognized specification of the power supply assembly from the battery intelligent management apparatus; and
    performing charge management on the power supply assembly using the extracted management mode.

2. The battery intelligent management method according to claim 1, further comprising:
    determining that the specification of the power supply assembly is a B-type float charged battery when the accumulated time of power grid disconnection within the preset time is less than or equal to 10 hours, and the accumulated time of a high temperature during which the working temperature of the battery exceeds the preset temperature within the preset time is also less than or equal to 10 hours;
    wherein the management mode extracted by the battery intelligent management apparatus comprises a charge current limiting point that is less than or equal to 0.10 C and a charge voltage that is in a range of 2.20-2.23V/CELL, and wherein charge management is performed on the B-type float charged battery using the management mode.

3. The battery intelligent management method according to claim 1, further comprising:
    determining that the specification of the power supply assembly is an A-type cycle battery when the accumulated time of power grid disconnection within the preset time is in a range that is greater than or equal to 30 hours and the accumulated time of a high temperature during which the working temperature of the battery exceeds the preset temperature within the preset time is in a range of 10-20 hours;
    wherein the management mode extracted by the battery intelligent management apparatus comprises a charge current limiting point that is in the range of 0.10-0.15 C and a charge voltage that is in the range 2.23-2.27V/CELL, and wherein charge management is performed on the A-type cycle battery using the management mode.

4. The battery intelligent management method according to claim 1, further comprising:
    determining that the specification of the power supply assembly is a C-type high temperature battery when the accumulated time of power grid disconnection within the preset time is in a range that is greater than or equal to 30 hours and the accumulated time of a high temperature during which the working temperature of the battery exceeds the preset temperature within the preset time is in a range that is greater than or equal to 30 hours;
    wherein a management mode extracted by the battery intelligent management apparatus comprises a charge current limiting point is is greater than or equal to 0.15 C and a charge voltage that is in the range of 2.23-2.27V/CELL, and wherein charge management is performed on the C-type high temperature battery using the management mode.

5. The battery intelligent management method according to claim 1, further comprising:
    detecting, by the battery intelligent management apparatus, discharge data in a discharge process of the power supply assembly, wherein the battery intelligent management apparatus further stores a preset-capacity parameter table comprising:
    a capacity coefficient in charge;
    discharge processes of the power supply assembly: and
    alarm protection points of a voltage and a current in the charge and discharge processes of the power supply assembly;
    calculating, by the battery intelligent management apparatus, an actual battery capacity of the power supply assembly according to the discharge data and the preset-capacity parameter table;
    calculating a health status of the power supply assembly according to the actual battery capacity of the power supply assembly; and
    alerting an operator to the health status using an alarm.

6. The battery intelligent management method according to claim 5, further comprising:
    detecting, by the battery intelligent management apparatus, a working ambient temperature of the power supply assembly;

enabling a cooling function when the detected working ambient temperature of the power supply assembly is higher than a preset temperature value; and enabling a heating function when the detected working ambient temperature of the power supply assembly is lower than the preset temperature value.

7. A battery intelligent management apparatus interconnected with a battery, wherein the battery intelligent management apparatus comprises:

a recognizing unit, configured to:
   detect an accumulated time of power grid disconnection within a preset time and an accumulated time of a high temperature during which a working temperature of the battery exceeds a preset temperature within a preset time; and
   recognize a specification of a power supply assembly of the battery according to the accumulated time of power grid disconnection or the accumulated time of the high temperature;

a storage unit, configured to store a plurality of management modes of power supply assemblies of various specifications, wherein the management modes of the power supply assemblies are in one-to-one correspondence with the specifications of the power supply assemblies; and a control unit, configured to extract from the storage unit a management mode corresponding to a recognized specification of the power supply assembly and perform charge management on the power supply assembly using the management mode.

8. The battery intelligent management apparatus according to claim 7, wherein the recognizing unit is further configured to determine that the specification of the power supply assembly is a B-type float charged battery when the accumulated time of power grid disconnection within the preset time is less than or equal to 10 hours and the accumulated time of a high temperature during which the working temperature of the battery exceeds the preset temperature within the preset time is also less than or equal to 10 hours; and wherein the corresponding management mode comprises a charge current limiting point that is less than or equal to 0.10 C and a charge voltage that is in a range of 2.20-2.23V/CELL.

9. The battery intelligent management apparatus according to claim 7, wherein the recognizing unit is further configured to determine that the specification of the power supply assembly is an A-type cycle battery when the accumulated time of power grid disconnection within the preset time is greater than or equal to 30 hours, and the accumulated time of a high temperature during which the working temperature of the battery exceeds the preset temperature within the preset time is in a range of 10-20 hours; and wherein the corresponding management mode comprises a charge current limiting point is in a range of 0.10-0.15 C and a charge voltage is is in a range of 2.23-2.27V/CELL.

10. The battery intelligent management apparatus according to claim 7, wherein the recognizing unit is further configured to determine that the specification of the power supply assembly is a C-type high temperature battery when the accumulated time of power grid disconnection within the preset time is in a range that is greater than or equal to 30 hours, and the accumulated time of a high temperature during which the working temperature of the battery exceeds the preset temperature within the preset time is greater than or equal to 30 hours; and wherein the corresponding management mode comprises a charge current limiting point that is greater than or equal to 0.15 C and a charge voltage is in a range of 2.23-2.27V/CELL.

11. The battery intelligent management apparatus according to claim 7, wherein the battery intelligent management apparatus further comprises:

a detecting unit; configured to detect discharge data in a discharge process of the power supply assembly; and a calculating unit, configured to:
   calculate an actual battery capacity of the power supply assembly according to the discharge data and a preset-capacity parameter table that is stored by the storage unit, wherein the preset-capacity parameter table comprises:
      a capacity coefficient in charge;
      discharge processes of the power supply assembly; and
      alarm protection points of a voltage and a current in the charge and discharge processes of the power supply assembly; and
   calculate a health status of the power supply assembly according to the actual battery capacity of the power supply assembly;

wherein the control unit is further configured to use an alarm to alert an operator to the health status calculated by the calculating unit, so as to remind the operator of the power supply assembly to replace the battery.

12. The battery intelligent management apparatus according to claim 11, wherein the discharge data comprises at least one of the following: a voltage, a current, and a temperature.

13. The battery intelligent management apparatus according to claim ii, further comprising:

a temperature control unit, wherein the detecting unit is further configured to detect a working ambient temperature of the power supply assembly; and wherein the temperature control unit is configured to:
   enable a cooling function when the detected working ambient temperature of the power supply assembly is higher than a preset temperature value; and
   enable a heating function when the detected working ambient temperature of the power supply assembly is lower than the preset temperature value.

14. A battery comprising:

a power supply assembly; and a battery intelligent management apparatus, configured to manage the power supply assembly, wherein the battery intelligent management apparatus comprises:

a recognizing unit, configured to:
   detect an accumulated time of power grid disconnection within a preset time and an accumulated time of a high temperature during which a working temperature of the battery exceeds a preset temperature within a preset time; and
   recognize a specification of a power supply assembly of the battery according to the accumulated time of power grid disconnection or the accumulated time of high temperature;

a storage unit, configured to store management modes of power supply assemblies of various specifications, wherein the management modes of the power supply assemblies are in one-to-one correspondence with the specifications of the power supply assemblies; and a control unit, configured to extract a management mode corresponding to the specification of the power supply assembly from the storage unit according to the specification, recognized by the recognizing unit, of the power supply assembly, and perform charge management on the power supply assembly by using the management mode.

15. The battery according to claim 14, wherein a total voltage of the power supply assembly comprises one of: 48V, 192V, or 384V.

16. A battery intelligent management apparatus interconnected with a battery, wherein the battery intelligent management apparatus comprises:
   a processor, configured to:
      detect an accumulated time of power grid disconnection within a preset time and an accumulated time of a high temperature during which a working temperature of the battery exceeds a preset temperature within a preset time; and
      recognize a specification of a power supply assembly of a battery according to the accumulated time of power grid disconnection or the accumulated time of high temperature;
   a memory, configured to store a plurality of management modes of power supply assemblies of various specifications, wherein the management modes of the power supply assemblies are in one-to-one correspondence with the specifications of the power supply assemblies, wherein the processor is further configured to extract from the memory a management mode corresponding to a recognized specification of the power supply assembly and perform charge management on the power supply assembly using the management mode.

17. The battery intelligent management apparatus according to claim 16, wherein the processor is further configured to determine that the specification of the power supply assembly is a B-type float charged battery when the accumulated time of power grid disconnection within the preset time is less than or equal to 10 hours and the accumulated time of a high temperature during which the working temperature of the battery exceeds the preset temperature within the preset time is also less than or equal to 10 hours; and
   wherein the corresponding management mode comprises a charge current limiting point that is less than or equal to 0.10 C and a charge voltage that is in a range of 2.20-2.23V/CELL.

18. The battery intelligent management apparatus according to claim 16, wherein the processor is further configured to determine that the specification of the power supply assembly is an A-type cycle battery when the accumulated time of power grid disconnection within the preset time is greater than or equal to 30 hours, and the accumulated time of a high temperature during which the working temperature of the battery exceeds the preset temperature within the preset time is in a range of 10-20 hours; and
   wherein the corresponding management mode comprises a charge current limiting point is in a range of 0.10-0.15 C and a charge voltage is is in a range of 2.23-2.27V/CELL.

19. The battery intelligent management apparatus according to claim 16, wherein the processor is further configured to determine that the specification of the power supply assembly is a C-type high temperature battery when the accumulated time of power grid disconnection within the preset time is in a range that is greater than or equal to 30 hours, and the accumulated time of a high temperature during which the working temperature of the battery exceeds the preset temperature within the preset time is greater than or equal to 30 hours; and
   wherein the corresponding management mode comprises a charge current limiting point that is greater than or equal to 0.15 C and a charge voltage is in a range of 2.23-2.27V/CELL.

20. The battery intelligent management apparatus according to claim 16, wherein the memory is further configured to store a preset-capacity parameter table, wherein the preset-capacity parameter table comprises a capacity coefficient in charge and discharge processes of the power supply assembly and alarm protection points of a voltage and a current in the charge and discharge processes of the power supply assembly; and
   wherein the processor is further configured to detect discharge data in a discharge process of the power supply assembly, calculate an actual battery capacity of the power supply assembly according to the discharge data and a preset-capacity parameter table that is stored in the memory, calculate a health status of the power supply assembly according to the actual battery capacity of the power supply assembly, and alert, by means of alarm, an operator to the health status, so as to remind the operator of the power supply assembly to replace the battery.

* * * * *